(12) United States Patent
Cone, II

(10) Patent No.: US 7,641,216 B2
(45) Date of Patent: Jan. 5, 2010

(54) FLAT FOLD STROLLER

(75) Inventor: Richard E. Cone, II, Athens, OH (US)

(73) Assignee: Dick Cone Industrial Design, Inc., Athens, OH (US)

( * ) Notice: Subject to any disclaimer, the term of this patent is extended or adjusted under 35 U.S.C. 154(b) by 403 days.

(21) Appl. No.: 11/682,018

(22) Filed: Mar. 5, 2007

(65) Prior Publication Data
US 2008/0217966 A1 Sep. 11, 2008

(51) Int. Cl.
*B62B 3/02* (2006.01)

(52) U.S. Cl. ............ 280/642; 280/42; 280/647; 280/649; 280/650; 280/641; 280/646

(58) Field of Classification Search .......... 280/642, 280/638, 38, 42, 647, 649, 650, 657, 658, 280/641, 646; 297/16.2, 56
See application file for complete search history.

(56) References Cited

U.S. PATENT DOCUMENTS

| | | | |
|---|---|---|---|
| 2,803,470 A | 8/1957 | Welsh | |
| 3,736,021 A | 5/1973 | MacLaren | |
| 3,836,164 A * | 9/1974 | Sugino et al. | 280/642 |
| 3,873,117 A | 3/1975 | Perego | |
| 3,954,068 A | 5/1976 | Roberts et al. | |
| 4,369,986 A | 1/1983 | de la Fé | |
| 4,378,946 A | 4/1983 | Voytko et al. | |
| 4,412,688 A | 11/1983 | Giordani | |
| 4,606,550 A | 8/1986 | Cone | |
| 4,762,335 A * | 8/1988 | Kassai | 280/649 |
| 4,848,787 A | 7/1989 | Kassai | |
| 5,087,066 A | 2/1992 | Mong-Hsing | |
| 5,257,799 A | 11/1993 | Cone et al. | |
| 5,522,614 A | 6/1996 | Eyman et al. | |
| 5,553,885 A | 9/1996 | Chang | |
| 5,718,444 A | 2/1998 | Huang | |
| 5,755,455 A * | 5/1998 | Chen et al. | 280/642 |
| 6,068,284 A | 5/2000 | Kakuda | |
| 6,095,548 A | 8/2000 | Baechler | |
| 6,375,213 B1 * | 4/2002 | Suzuki | 280/649 |
| 6,428,034 B1 | 8/2002 | Bost | |
| 6,581,957 B1 | 6/2003 | Lan | |
| 6,698,788 B2 | 3/2004 | Yang | |

(Continued)

FOREIGN PATENT DOCUMENTS

WO    WO 2006/079012 A1    7/2006

OTHER PUBLICATIONS

U.S. Appl. No. 12/028,418, filed Feb. 8, 2008, Cone.

*Primary Examiner*—Lesley D Morris
*Assistant Examiner*—Bryan A Evans
(74) *Attorney, Agent, or Firm*—Oblon, Spivak, McClelland, Maier & Neustadt, L.L.P.

(57) ABSTRACT

A folding chair includes handle frames, and front legs and rear legs configured to support the chair in an upright position. The front legs are pivotally attached to respective rear legs. A chair portion, includes a back rest, a seat and a leg rest pivotally attached to the seat. Pivot frames are pivotally attached to respective handle frames, the back rest and the rear legs. Sliders are pivotally attached to respective pivot frames, the back rest, respective arm rests and the seat and are configured to slide along the front legs.

5 Claims, 12 Drawing Sheets

U.S. PATENT DOCUMENTS

| | | |
|---|---|---|
| 6,964,429 B2 | 11/2005 | Suga et al. |
| 7,044,497 B2 | 5/2006 | Hartenstine et al. |
| 7,077,423 B2 * | 7/2006 | Hutchinson ................. 280/649 |
| 2006/0006629 A1 | 1/2006 | Riedl et al. |
| 2006/0237930 A1 | 10/2006 | Logger |

\* cited by examiner

FLAT FOLD STROLLER

BACKGROUND

1. Field of Invention

Exemplary embodiments of this invention relate to folding strollers which when in a folded state occupy a small volume of space and allow for easy transport and storage.

2. Description of Related Art

Related art folding strollers have been developed to increase portability by reducing a volume of space occupied by the stroller when in its folded state. Reducing the volume of space occupied by the stroller in a folded state allows the stroller to be more easily handled by a user, decreases the amount of space required for storage when not in use and allows for easy transportability by allowing the folded stroller to be easily placed in the trunk of a car, for example. Reduced volume also decreases shipping costs, in an era when manufacturing facilities are located globally and individuals utilize the internet to purchase goods.

Related art folding strollers may have a problem that the length of the stroller in its folded state is the same or even greater than when in its unfolded state. Because it is desirable to enhance portability, allow easier handling and reduce the volume of space occupied by a stroller when in its folded state exemplary aspects of this invention provide a flat folding stroller that addresses these and/or other requirements A related art stroller, known popularly as the MacLaren stroller and disclosed in U.S. Pat. No. 3,736,021 includes upper and lower X-shaped frame members which allow substantially identical side and leg members to be collapsed to reduce the stroller's width. However, when in a folded state, the length of the stroller increases when the front wheel assembly is pivoted in a direction away from the rear wheels. Also, because the handle portion is pivoted towards the front wheels and extends past the front wheels, the length is extended even more. This increased length in the folded state makes it difficult to store, handle and transport the stroller. Additionally, the overall cost of the product may be increased due to increased shipping costs.

SUMMARY

Exemplary aspects of this invention provide apparatus and methods that provide a stroller with enhanced portability, that occupies a small volume of space when in a folded state and that is easily handled by a user.

A stroller according to an exemplary aspect of this invention includes two front legs and two rear legs that support the stroller in an upright position, two handle frames and two first upper sliders that slide along respective handle frames. An upper X frame includes two upper frame members that are pivotally connected to each other at respective intermediate portions. Each upper frame member is pivotally connected to respective first upper sliders and to respective rear legs. Two second lower sliders slide along respective front legs. A lower X frame member includes two lower frame members pivotally connected to each other at respective intermediate portions. Each lower frame member is pivotally connected to respective second lower sliders and attached to respective rear legs. Two pivot frames are linked to respective second sliders and pivotally attached to respective rear legs. A pair of wheels are rotationally attached to the front legs, and a pair of wheels are rotationally attached to the rear legs.

A stroller according to an exemplary aspect of this invention includes lower frame members with engaging portions that engage a respective rear leg to reduce the likelihood or prevent the stroller from folding and to provide lateral rigidity.

A stroller according to an exemplary aspect of this invention includes two back frames, two lateral portions rotationally attached to respective back frames and to respective lower legs, and a seat portion supported by the back frames and the lateral portions.

Exemplary aspects of this invention provide a stroller including two handle frames, two front legs and two rear legs that support the stroller in an upright position. Front legs are pivotally attached to respective rear legs. A chair portion, includes a back rest, a seat and a leg rest pivotally attached to the seat. Two pivot frames are pivotally attached to respective handle frames. The back rest and the rear legs, two arm rests and two sliders are pivotally attached to respective pivot frames. The back rest, respective arm rests and the seat slide along the respective front legs. Wheels are rotationally attached to the front legs and the rear legs.

Exemplary aspects of this invention provide a stroller including a pre-load mechanism with a suspension pivotally attached to at least one of the front and rear legs and supporting an axle of a wheel. A resilient member, such as a spring, is attached at one end of the suspension, and a cam is attached to another end of the resilient member and pivots to compress the resilient member.

Exemplary aspects of this invention provide a lock release mechanism configured to retain the stroller in a rigid unfolded state when locked and allow the stroller to be collapsed when released. The lock release mechanism may include a two step release mechanism.

Exemplary aspects of this invention provide a stroller including arm rests with an attachment portion to allow an item to be attached to the arm rests. The attachment portion may include for example, one of a slot or tab and an item to be attached may include the other of a slot or a tab. The item to be attached may be a cup holder, a tray and/or a toy or any other suitable item.

Exemplary aspects of this invention include a pivot lock pivotally connected to a handle portion and a pivot lock lip, and a lip portion that engages with the pivot lock lip to maintain the stroller in a folded state. The pivot lock may be a tray including a tray portion and arm portions and the lip portion may be located on a foot rest.

Exemplary aspects of this invention may include a seat belt tensioner for a seat belt, wherein a back rest includes throughholes through which a seat belt is passed. The belt is retained by a locking portion at one end and another end of the seat belt is attached to an underside of the seat. When the folding chair is in a folded state, the locking portion is pulled toward the back rest.

Exemplary aspects of this invention include a back rest with an adjustable incline so that when the folding chair is folded and unfolded the back rest is retained at its adjusted incline.

Exemplary aspects of the invention provide a method of folding a stroller including two front legs and two rear legs that support the stroller in an upright position, two handle frames, and two first upper sliders that slide along respective handle frames, an upper X frame including two upper frame members pivotally connected to each other at respective intermediate portions, each upper frame member pivotally connected to respective first upper sliders and to respective rear legs, two second lower sliders that slide along respective front legs, a lower X frame member including two lower frame members pivotally connected to each other at respective intermediate portions, each lower frame member pivotally connected to respective second lower sliders and attached to respective rear legs, and two pivot frames linked to respective second sliders and pivotally attached to respective rear legs. The method includes detaching the two lower frame members from respective rear legs. A top portion of the handle frames is pivoted toward the front of the stroller. First upper sliders slide upward along respective handle frames and second lower sliders slide downward along respective front legs so that handle frames, front legs and rear legs become substantially parallel. The upper frame member and the lower frame members are collapsed about the respective intermediate pivot points so that the two handle frames move toward each other, the two front legs move toward each other and the two rear legs move toward each other.

Exemplary aspects of the invention provide a method of folding a stroller including two handle frames, two front legs and two rear legs configured to support the stroller in an upright position, the front legs pivotally attached to respective rear legs, a chair portion, including a back rest, a seat and a leg rest pivotally attached to the seat, two pivot frames pivotally attached to respective handle frames, the back rest and the rear legs, two arm rests, and two sliders pivotally attached to respective pivot frames, the back rest, respective arm rests and the seat and configured to slide along the respective front legs. The method includes pivoting a top portion of the handle frames toward a front of the chair. The handle frames are pivoted toward the front of the chair. The sliders slide downward along the leg. The rear legs are pivoted toward the front legs. The backrest is pivoted toward the front of the chair and the leg rests toward a rear of the chair. The handle frames, the slider, the front and rear legs, the backrest and the leg rest become substantially parallel in their length directions.

BRIEF DESCRIPTION OF THE DRAWINGS

Various example embodiments of the invention will be described in detail, with reference to the following figures, wherein.

DETAILED DESCRIPTION OF THE EXEMPLARY EMBODIMENTS

Figure 1:
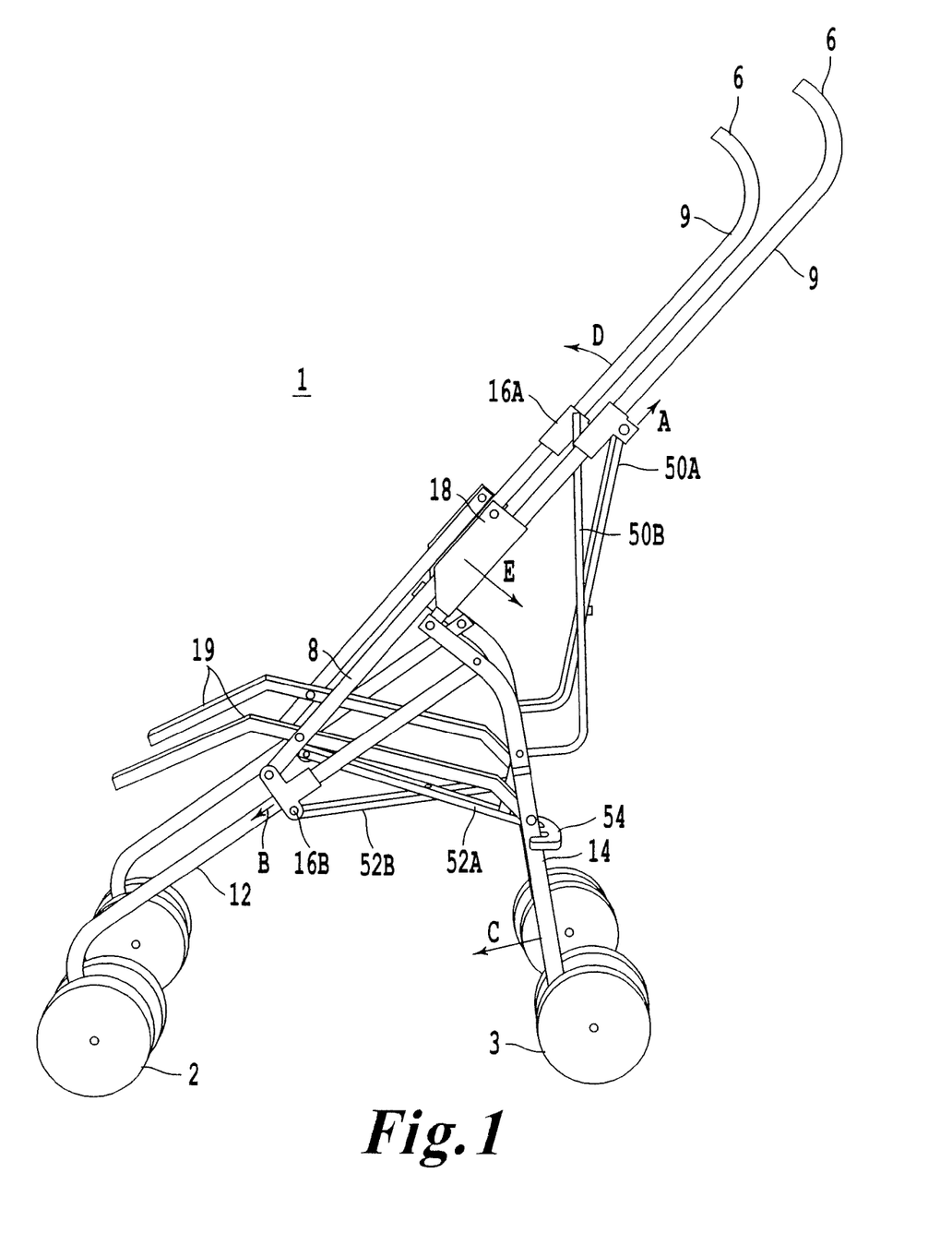
FIG. 1 is schematic side view of a first example embodiment of a stroller in a completely unfolded state.

FIG. 1 illustrates a side view of a first example embodiment of a stroller in a completely unfolded state. For purposes of clarity to show the elements of the stroller, the sling seat portion of the stroller is not shown in FIGS. 1-4. It should be appreciated by one of ordinary skill that in the following description some components of the stroller are provided in pairs and are identically situated on each side of the stroller. One of ordinary skill should appreciate that although the figures and following description are directed to a stroller the features of the example embodiments may be utilized in any folding chair.

Stroller 1 includes a handle portion 6 located at an end of a handle frame 9. At an end of handle frame 9 opposite from the handle 6, pivot frame 18 is rigidly attached. A portion of handle frame 9 protrudes past pivot frame 18 and is pivotally connected to an end of rear leg 14. An end of rear leg 14, opposite to the end pivotally connected to handle frame 9 has rear wheels 3 rotationally attached. An intermediate portion of rear leg 14 is pivotally attached to one end of front leg 12. An end of front leg 12, opposite to the end pivotally attached to rear leg 14 has front wheels 2 rotationally attached.

Stroller 1 includes sliders 16A, 16B. Slider 16A is slidably attached to handle frame 9. According to an example embodiment, slider 16A has a cylindrical opening through which handle frame 9 is inserted so as to be surrounded by slider 16A. One of ordinary skill would readily appreciate that slider 16A may be configured in any suitable manner to slide or move relative to handle frame 9. In a non-limiting example, handle frame 9 may be configured with a groove while slider 16A is configured with a slot or pin that slides within the groove of handle frame 9.

Slider 16A is pivotally attached to one end of frame members 50A, 50B of upper X frame 50. Frame members 50A and 50B are pivotally attached to each other at an intermediate connection point to form a substantially X shaped frame when the stroller is in a completely unfolded state. The end of frame members 50A, 50B, opposite to the end pivotally attached to respective slider 16A, is pivotally attached to an intermediate portion of respective rear leg 14.

Slider 16B is slidably attached to front leg 12. According to an example embodiment, slider 16B has a cylindrical opening through which front leg 12 is inserted so as to be surrounded by slider 16B. As discussed with reference to slider 16A above, one of ordinary skill would readily appreciate that slider 16B may be configured in any suitable manner to slide or move relative to front leg 12.

Slider 16B is pivotally connected to one end of side frame 8. An end of side frame 8, opposite to the end connected to slider 16B, is pivotally attached to pivot frame 18. Sling seat (not shown) may be attached to a slider 16A and 16B. An intermediate portion of side frame 8 is pivotally connected to lateral portion 19. Lateral portion 19 provides support for a seat portion of a seat disposed on stroller 1. Slider 16B is pivotally connected to one end of frame members 52A, 52B of lower X frame member. Frame members 52A and 52B are pivotally attached to each other at an intermediate connecting portion to form a substantially X shape when in a completely unfolded state. The end of each frame member 52A, 52B opposite to the end pivotally connected to slider 16B is attached to an intermediate portion of rear leg 14, by leg support 54. In a non-limiting example, leg support 54 has grooves which in the completely unfolded state of stroller 1 retain rear leg 14. One of ordinary skill would readily appreciate the leg support 54 may have multiple configurations so long as leg support 54 may be attached to rear leg 14 to maintain stroller 1 in a rigid state and to prevent the stroller from inadvertently moving to a folded state.

Figure 2:
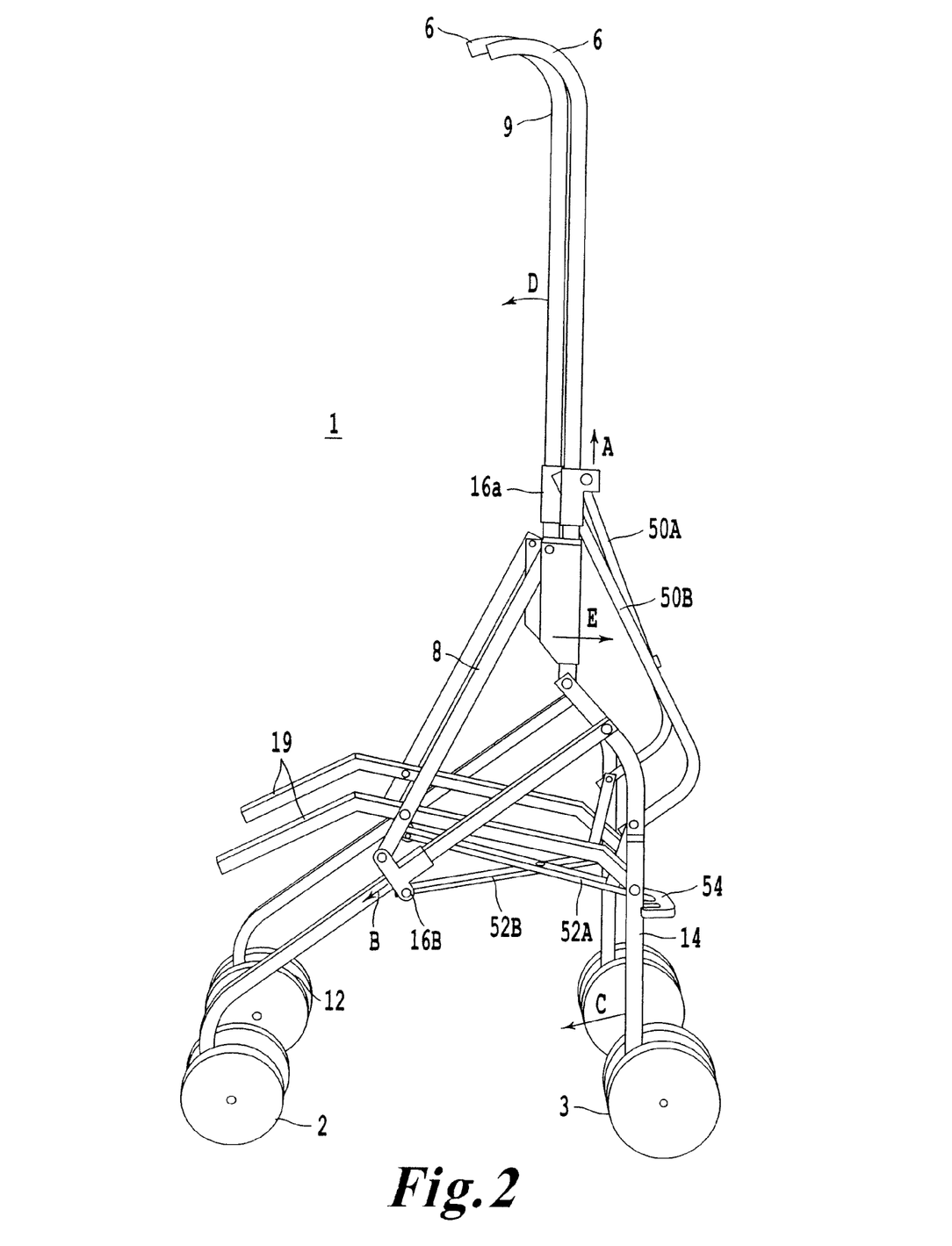
FIG. 2 is a schematic side view of the first example embodiment of the stroller of FIG. 1 when beginning to be placed in a folded state.

An operation to fold stroller 1 will be described with reference to FIGS. 1 and 2. Handle frame 9 is pivoted in a direction as shown by arrow D. By pivoting handle frame 9, pivot frame 18 rotates at its pivot point in a direction as shown by arrow E. Through its connection to pivot frame 18, rear leg 14 pivots in a direction toward front wheels 2, as shown by arrow C. As rear legs 14 pivot, leg support 54 is allowed to disengage from rear legs 14. Leg support 54, when engaged with rear legs 14 prevents frame members 52A, 52B from being collapsed toward each other. When leg support 54 is disengaged from rear leg 14, frame members 52A, 52B may be collapsed toward each other around their intermediate connection point so that they move toward being substantially parallel. As frame members 52A and 52B collapse toward each other, the first and second halves of the stroller move toward each other to narrow the width of the stroller.

As handle frame 9 is pivoted in a direction shown by arrow D, slider 16A travels toward handle 6. Frame members 50A and 50B, pivotally attached to slider 16A, collapse toward each other around their intermediate connection point so they move toward being substantially parallel. As pivot frame 18 pivots, slider 16B is pushed along front legs 12 toward front wheels 2, through side frame 8 as shown by arrow B. As slider 16B moves toward front wheels 2, frame members 52A and 52B are collapsed toward each other through their respective pivotal connection to slider 16B.

Figure 3:
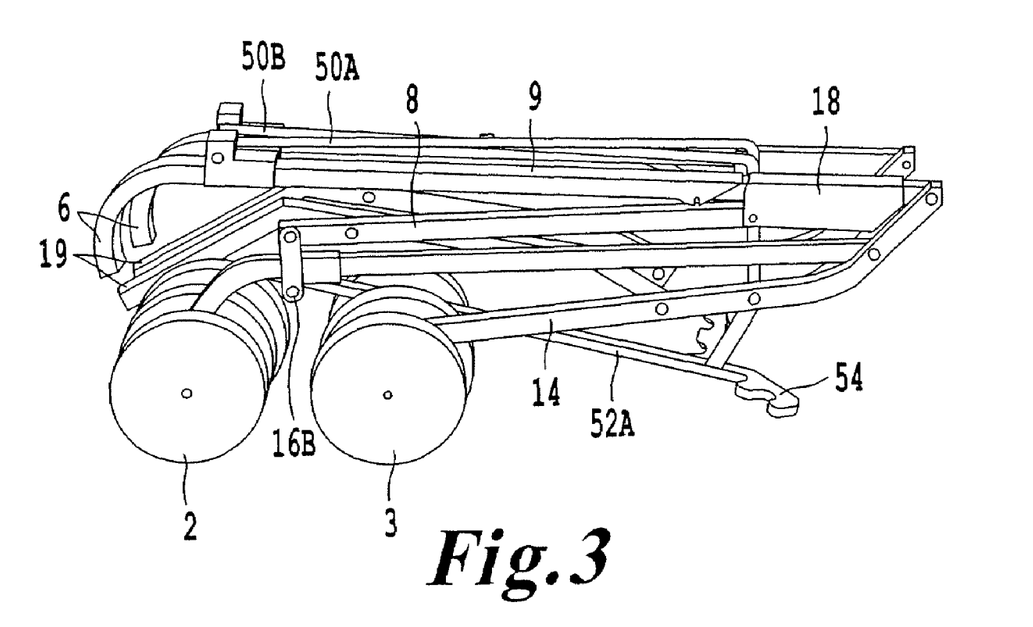
FIG. 3 is a schematic side view of the first example embodiment of the stroller of FIG. 1 in a folded state.
Figure 4:
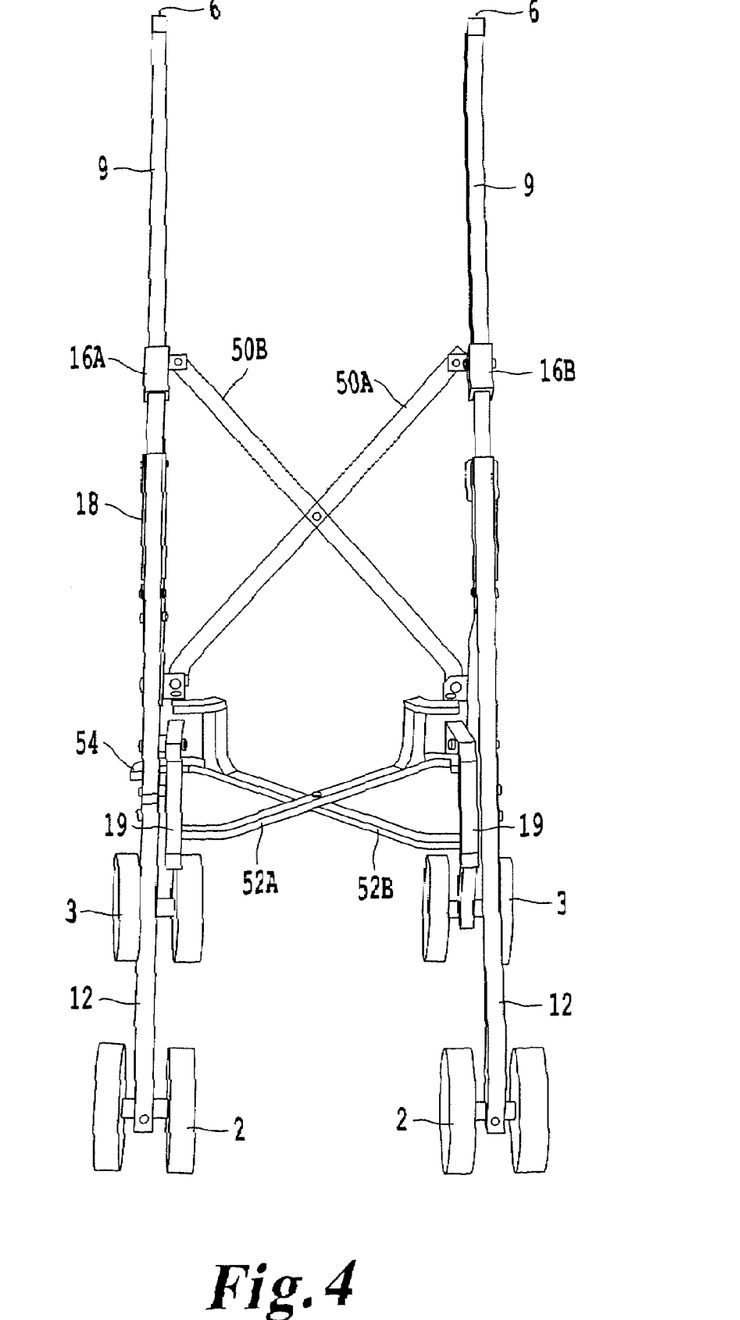
FIG. 4 is a schematic front view of the first example embodiment of the stroller of FIG. 1 in a completely unfolded state.
Figure 5:
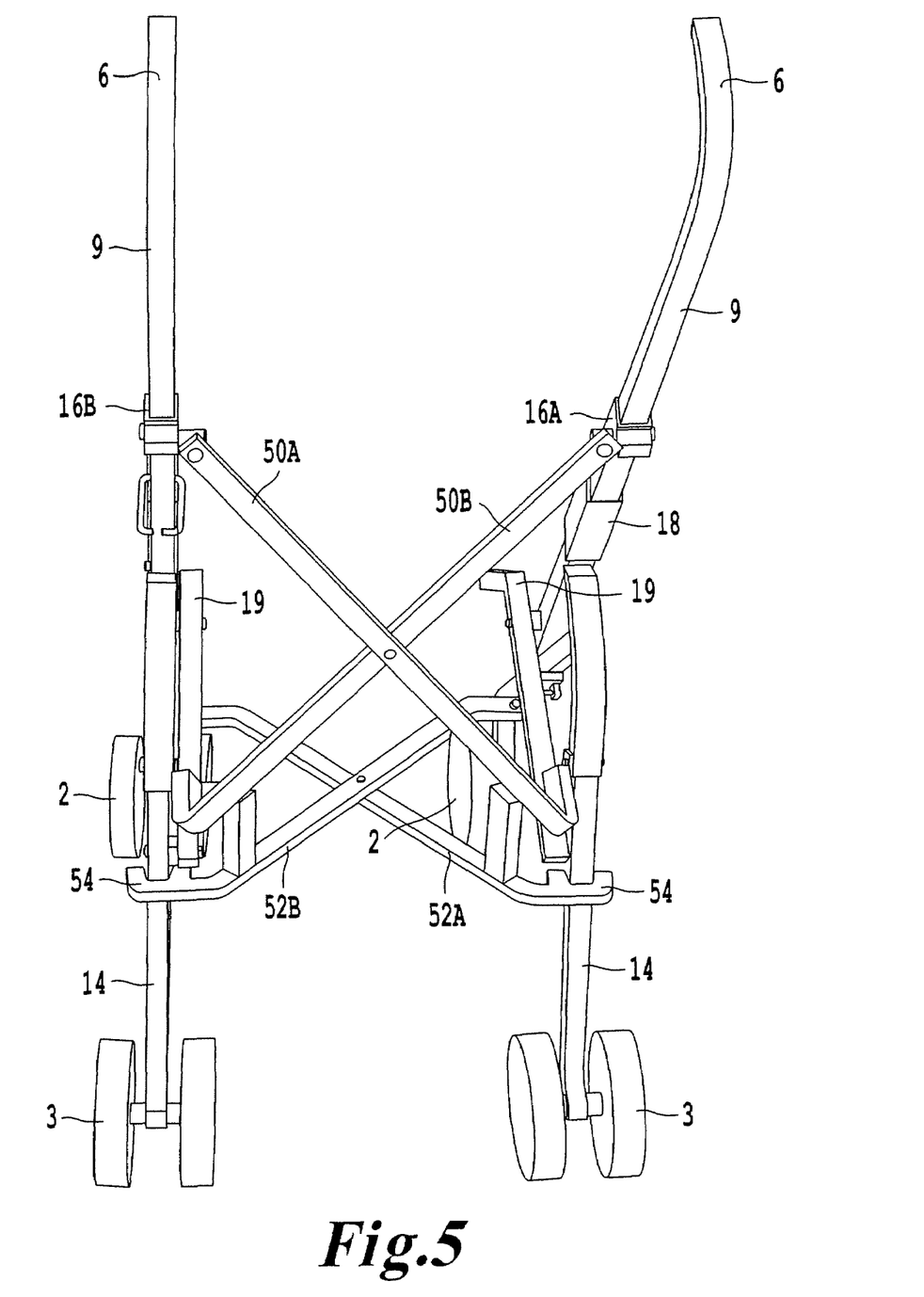
FIG. 5 is a schematic rear view of the first example embodiment of the stroller of FIG. 1 in a completely unfolded state.

In a completely folded state, as shown in FIG. 3, rear wheels 3 move towards the front wheels 2 and are not located on opposites sides of the length of the stroller as in the related art described above. Frame members 50A, 50B are collapsed toward each other to reduce the width of the stroller 1. Front leg 12, rear leg 14, handle frame 9, back frame 8 and lateral portion 19 become substantially parallel to provide a folded stroller 1 which occupies a small volume of space in a length as well as in a width direction.

Figure 6:
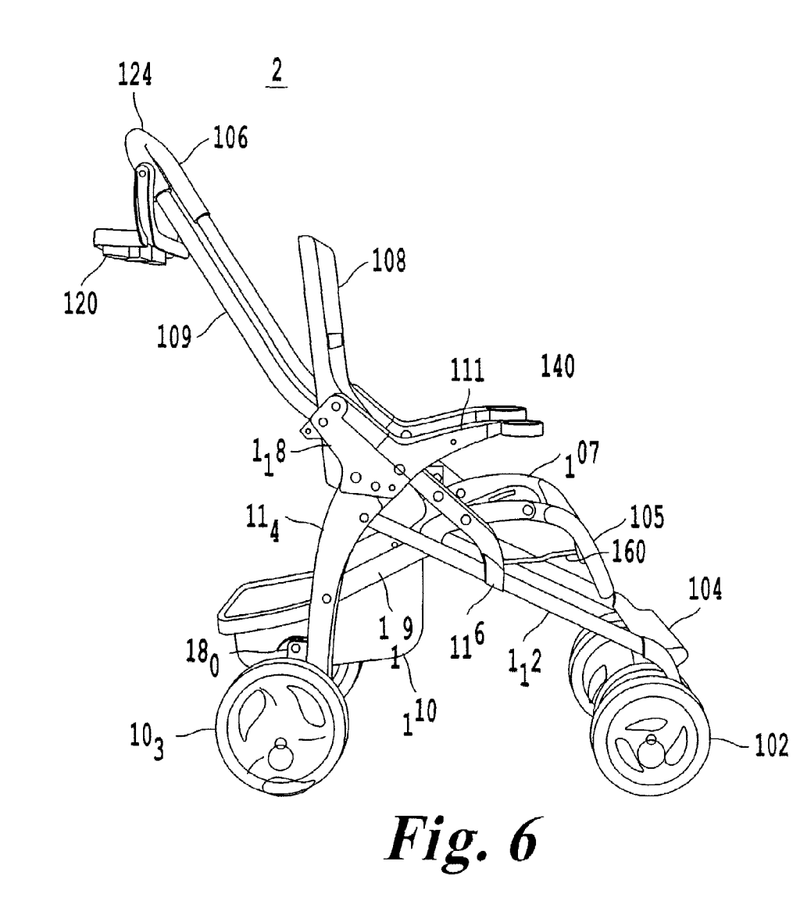
FIG. 6 is a schematic side view of a second example embodiment of a stroller in a completely unfolded state.
Figure 13:
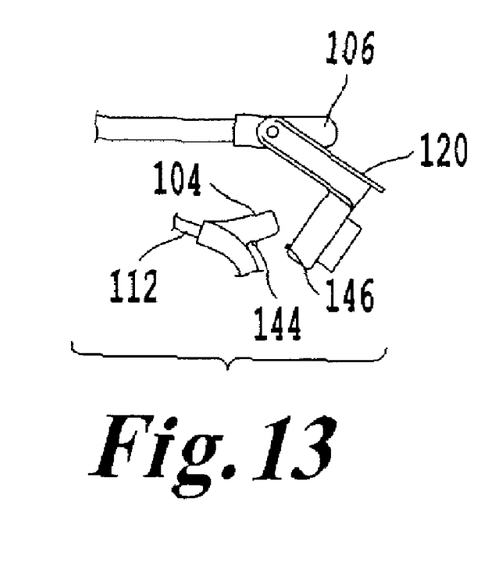
FIG. 13 is a schematic of a pivot lock according to an exemplary embodiment of the invention.
Figure 14A:
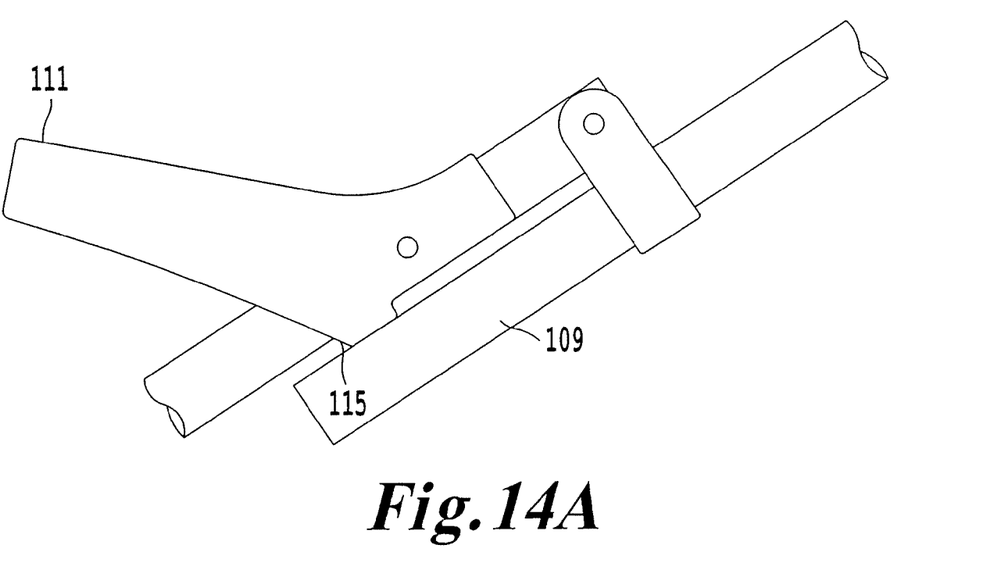
FIGS. 14A and 14B are schematics of an arm rest including an abutment portion according to an exemplary embodiment of the invention.
Figure 14B:
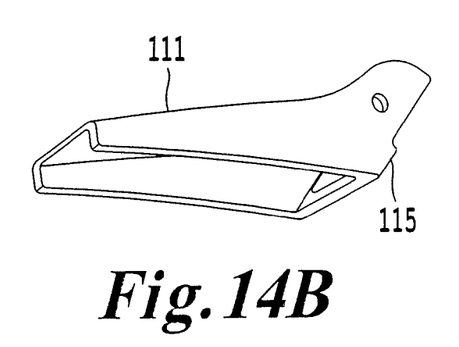

FIG. 6 is a schematic side view of a second example embodiment of a stroller in a completely unfolded state. Stroller 2 includes a handle portion 106 located at an end of handle frame 109. As shown in FIG. 13 pivot lock 120 is pivotally attached to handle portion 106. According to an example embodiment, when stroller 2 is in the unfolded state, pivot lock 120 hangs with tray 121 in a substantially horizontal state. Tray 121 may be provided in the form of a storage place such as a cup holder. Pivot lock 120 includes pivot lock lip 146. When stroller 2 is placed in a completely folded state, the pivot lock 120 is pivoted so that the pivot lock lip 146 engages with a corresponding lip 144 located on a lower lateral portion of foot rest 104. By engaging pivot lock lip 146 with lip 144, the stroller 2 may be prevented from becoming unfolded.

At an end of the handle frame 109 opposite from the handle 106, pivot frame 118 is rigidly attached. Rear leg 114 is pivotally attached to pivot frame 118 at one end. At an opposite end of rear leg 114 rear wheels 103 are rotationally attached. Back rest 108 is pivotally attached to front leg 112. Slider 116 is pivotally attached to pivot frame 118. An intermediate portion of slider 116 is pivotally attached to seat 107. An end of the slider 116 that is opposite to the end pivotally attached to the pivot frame 118 is slidably attached to front leg 112. According to an example embodiment, slider 116 has a cylindrical opening which surrounds front leg 112 and slides over front leg 112. However, one of ordinary skill would appreciate that slider 116 may have multiple configurations to slide relative to front leg 112.

Seat 107 includes two parallel lateral portions 119. One end of lateral portion 119 is pivotally attached to leg rest 105. An intermediate portion of lateral portion 119 is pivotally connected to an intermediate portion of slider 116. An end of lateral portion 119 opposite to the end attached to leg rest 105 is pivotally attached to an intermediate portion of rear leg 114.

Front leg 112 is attached at one end to foot rest 104 and at an opposite end to rear leg 114 at an end of rear leg 114 that is opposite to the end that rear wheel 103 is attached to. The front wheels 102 may be rotationally attached to front leg 112.

Figure 7:
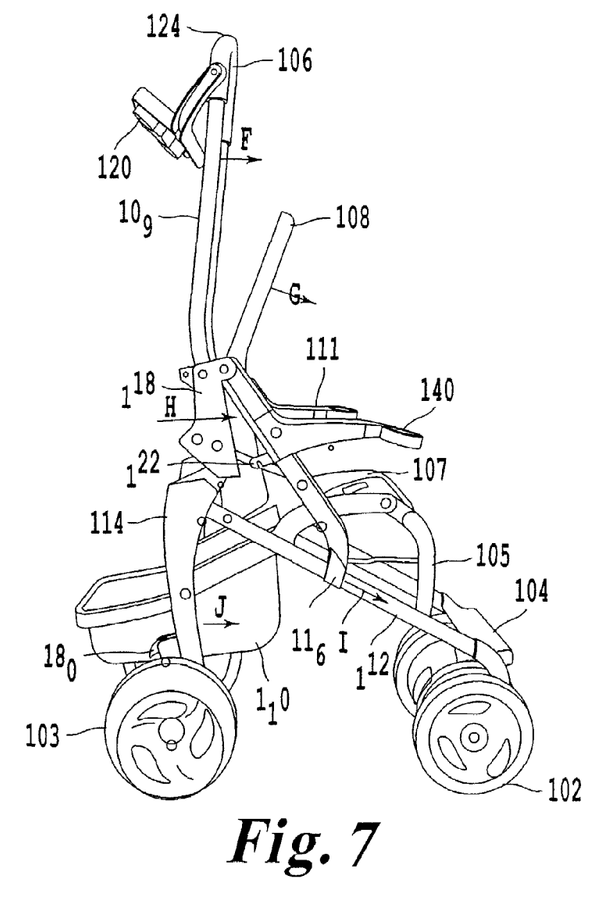
FIG. 7 is a schematic side view of the second example embodiment of the stroller of FIG. 6 when beginning to be placed in a folded state.
Figure 8:
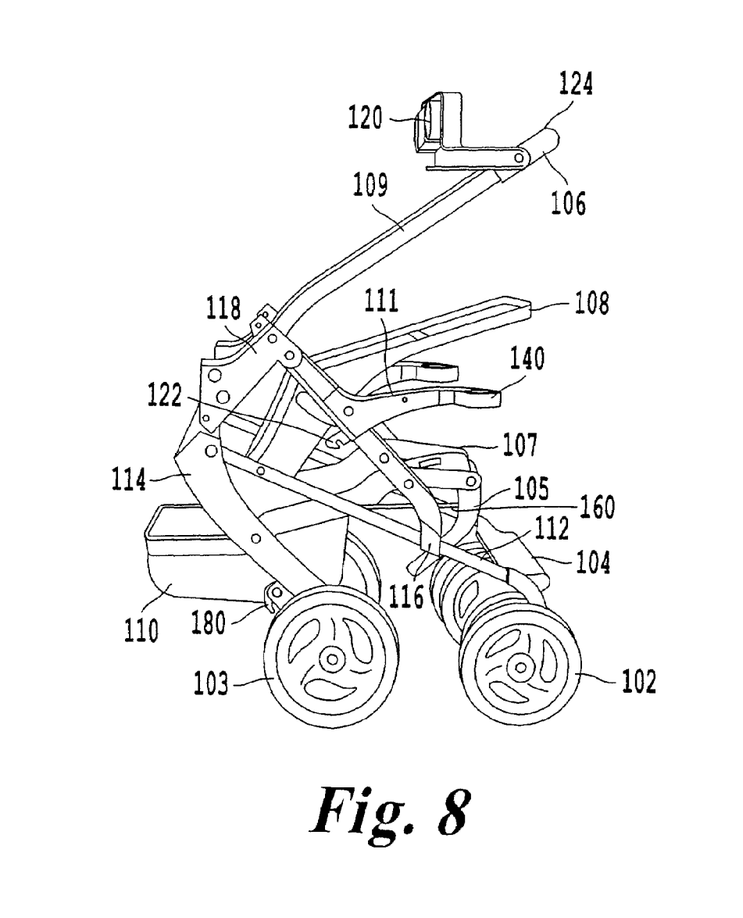
FIG. 8 is a schematic side view of the second example embodiment of the stroller of FIG. 6 in a partially folded state.
Figure 9:
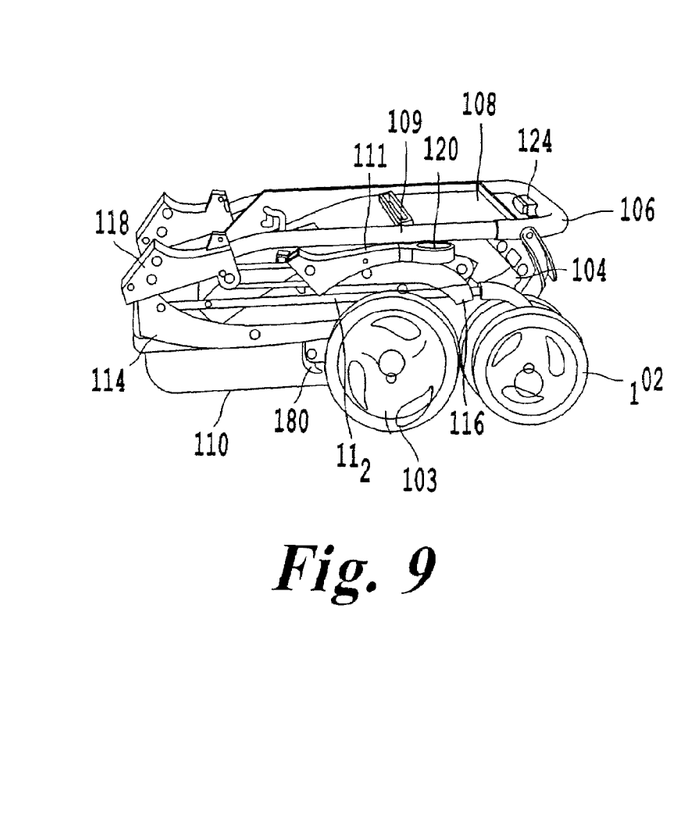
FIG. 9 is a schematic side view of a second example embodiment of the stroller of FIG. 6 in a completely folded state.
Figure 10:
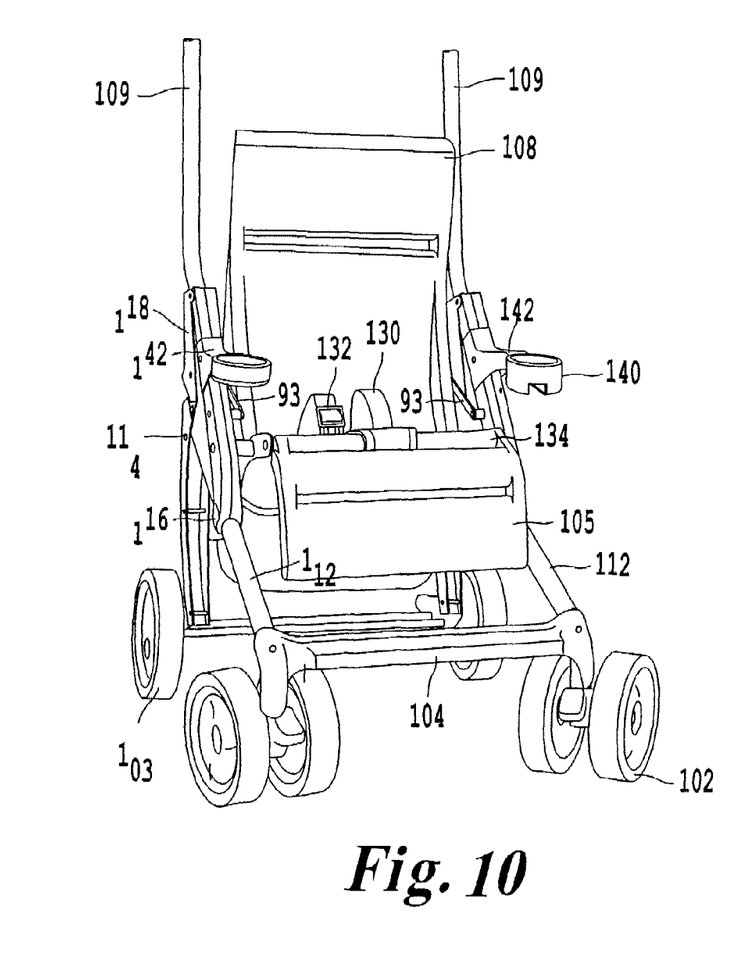
FIG. 10 is a schematic front view of the second example embodiment of the stroller of FIG. 6 in an unfolded state.
Figure 11:
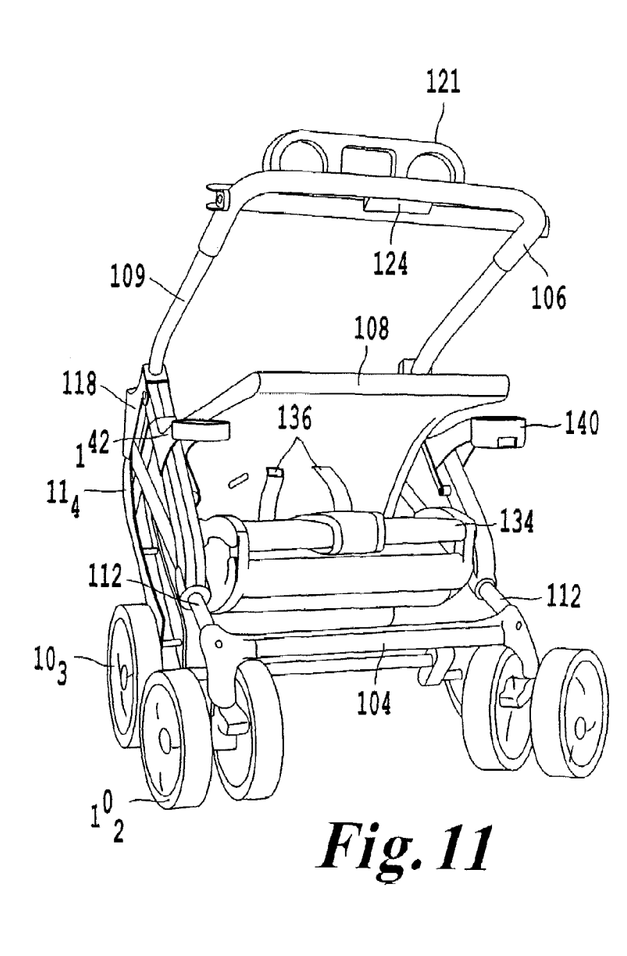
FIG. 11 is a schematic front view of the second example embodiment of the stroller of FIG. 6 when beginning to be placed in a folded state.

An operation to fold stroller 2 will be described with reference to FIGS. 7-9. As shown in FIG. 9, lock release 124 is located to be centered on the handle portion 106. Lock release 124 includes a two step release mechanism. The first step, for example, a push button, allows the second step, for example, two spring loaded squeeze buttons, to be urged toward each other to release latch 122. When latch 122 is released stroller 2 is able to be folded. It should be noted that a release mechanism is required under common safety standards. When latch 122 is in a latched position the stroller may maintain rigidity when in an unfolded state and accidental folding of the stroller when in use may be prevented.

Once the latch 122 has been released from a latched position, the stroller 2 may be folded. Handle frame 109 is pivoted toward the front of the stroller in a direction shown by arrow F in FIG. 7. Handle frame 109 is rigidly connected to pivot frame 118. Thus, pivot frame 118 will also pivot forward as a result of handle frame 109 being pivoted forward as shown by arrow H. As pivot frame 118 is pivoted forward, slider 116 is urged forward through its pivotal connection to pivot frame 118. As shown by arrow I, slider 116 will slide forward along front leg 112. Slider 116 is pivotally connected at an intermediate portion to lateral portion 119, which in turn is pivotally connected to rear leg 114. As slider 116 slides forward along front leg 112, rear leg 114 is pulled forward, as shown by arrow J, via lateral portion 119. Back rest 118, which is pivotally connected to front leg 112 also pivots forward. Leg rest 105 is pivotally connected to wire link 160. Wire link 160 is pivotally attached to front leg 112.

As handle frame 109 continues to pivot forward, the slider 116 slides along the remaining length of front leg 112. As shown in FIG. 9, in a folded position, handle frame 109, slider 116, front leg 112, lateral portion 119 and rear leg 114 are substantially parallel to each other along a length portion of each resulting in a folded chair that occupies a small volume of space, is easy to handle, transport and store.

As shown in FIG. 13 when stroller 2 is in a folded state, pivot lock 120 is pivoted around handle 106 so that pivot lock lip 146 engages with lip 144 located on foot rest 104. As discussed above this prevents the stroller 2 from becoming unfolded.

Figure 12:
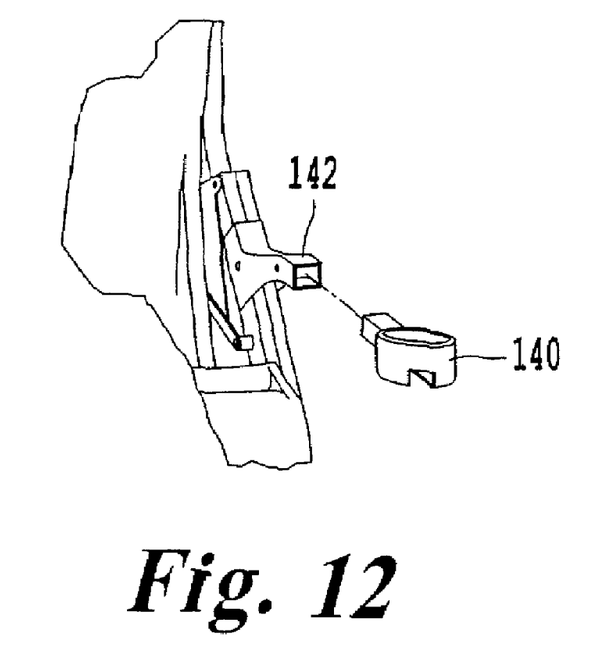
FIG. 12 is a schematic detail of an arm rest according to an example embodiment of the invention including an attachment portion.

Arm rest 111 is pivotally attached to slider 116 at one end. As slider 116 slides forward along front leg 112, arm rest 111 pivots toward slider 116. In a folded state arm rest 111 is substantially parallel with slider 116 along the length portion of each. At an end of arm rest 111 opposite the end pivotally attached to the slider, there may be provided an arm rest accessory 140 which may be detachable from arm rest 111. The accessory may be attached to the arm rest 111 in any suitable manner. In an example embodiment shown in FIG. 12, arm rest 111 is provided with a slot 142 through which arm rest accessory 140, shown as a cup holder in FIG. 12 is attached. One of ordinary skill would recognize that arm rest accessory 140 may be configured in any suitable manner, such as for example, a tray provided with slots for each arm rest 111. Arm rest 111 includes an abutment portion 115 which abuts against pivot frame 118 or in another example embodiment against handle frame 9.

Figure 15A:
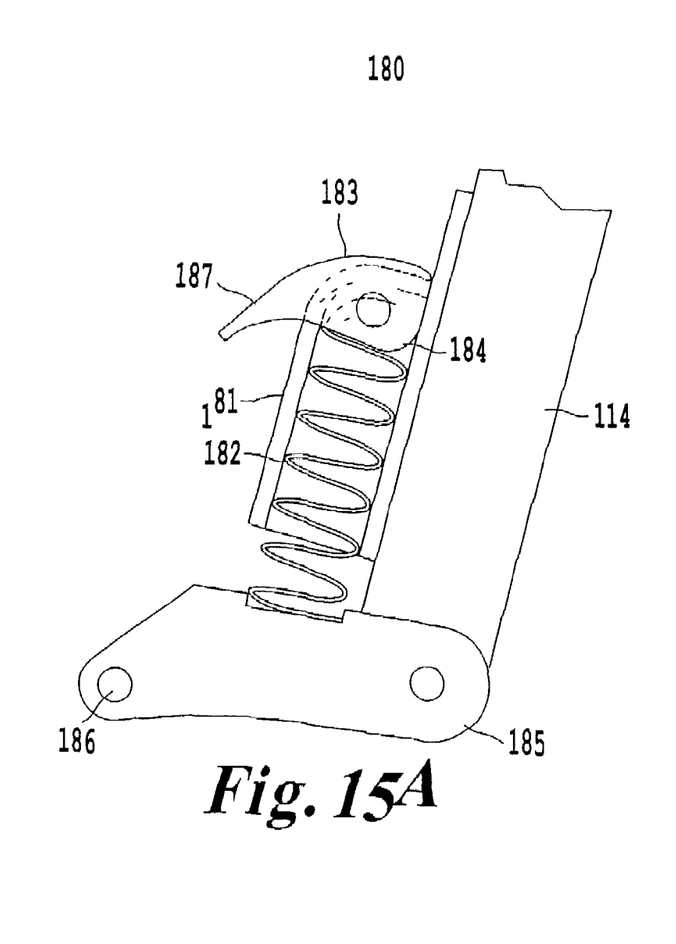
FIGS. 15A and 15B are schematics of a pre-load mechanism according to an example embodiment of the invention.
Figure 15B:
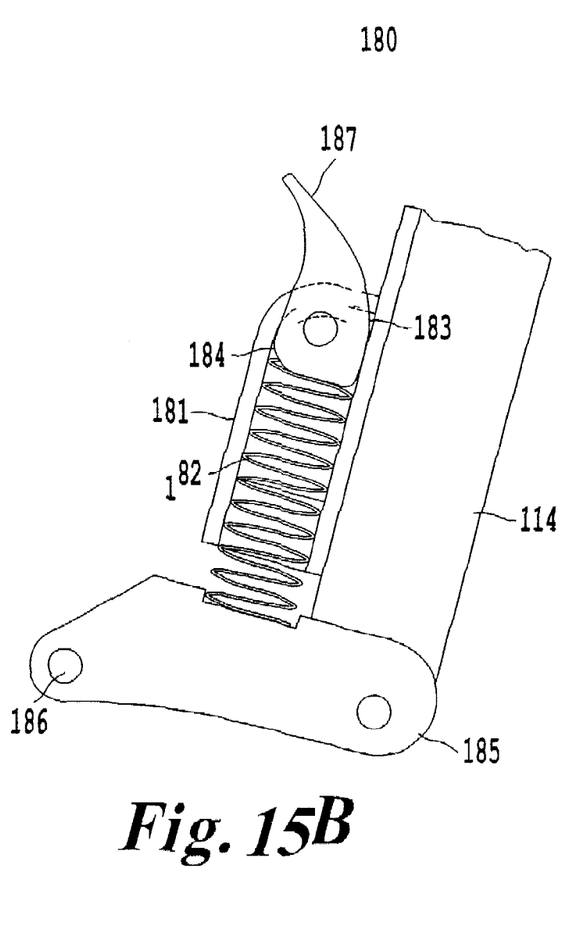

As shown in FIGS. 15A and 15B, a pre-load mechanism 180 may be provided to adjust the ride characteristics of the stroller depending upon the weight of the object or person placed upon the stroller or a desired comfort level. Pre-load mechanism 180 includes a casing 181 with a hollow interior. Resilient member 182 is mounted to be compressible within the casing 181 via cam 183 which includes an abutment surface 184 which abuts one end of resilient member 182. Cam 183 has a pivot handle 187 which is used to pivot cam 183 to compress or decompress resilient member 182. An end of resilient member 182, opposite the end that abuts abutment surface 184 of cam 183 is fixed to an intermediate portion of suspension 185. Suspension 185 is pivotally attached at substantially one end to rear leg 114 and at an opposite end to rear axle 186 which supports rear wheels 103.

An operation of the pre-load mechanism 180 will now be described. In an unloaded state, resilient member 182 is not compressed by action of cam 183. Forces operating on rear wheels 103 are transmitted via axle 186 to suspension 185 which pivots about its pivotal connection with rear leg 114. Resilient member 182 applies a load to suspension 185 which absorbs the forces operating on rear wheels 103 so they are not transmitted to an occupant of the stroller 2 to cause an uncomfortable ride. As an occupant of stroller 2 becomes heavier, resilient member 182 in its uncompressed state may be inadequate to absorb the forces acting on rear wheels 103. By lifting handle 187, cam 183 pivots and abutment portion 184 compresses resilient member 182. In a compressed state, resilient member 182 may absorb forces acting on rear wheels 103 for a heavier load.

Seat 107, backrest 108 and leg rest 105 together provide the seat portion for an occupant of the stroller. Leg rest 105 is pivotally attached to seat 107. Backrest 108 is pivotally attached to front leg 112. Thus, the sitting position is configured in separate sections which may be foldable relative to each other.

Backrest 108 includes through-holes 136. Because seat 107, backrest 108 and leg rest 105 are configured in separate sections, gaps 134 are formed between each section. Belt 130 is provided to retain an occupant of stroller 2 for safety purposes. Belt 130 includes belt lock 132 to fix the belt to retain an occupant. Belt 130 passes to a rear side of backrest 108 via through-holes 136 and then is passed under the backrest 108 and fixed to an underside of seat 107. As the stroller 2 is moved to a folded state, belt 130 is pulled taught by a movement of seat 107. Belt 130 is pulled from the rear of through-holes 136. Belt 130 is prevented from completely passing through through-holes 136 by belt lock 132, which is made larger than the through-holes 136. In a folded state, belt lock 132 is held against backrest 108 and prevented from falling between gaps 134. If belt lock 132 falls into gaps 134 it could become damaged due to compression between the folded portions of the stroller.

Figure 16:
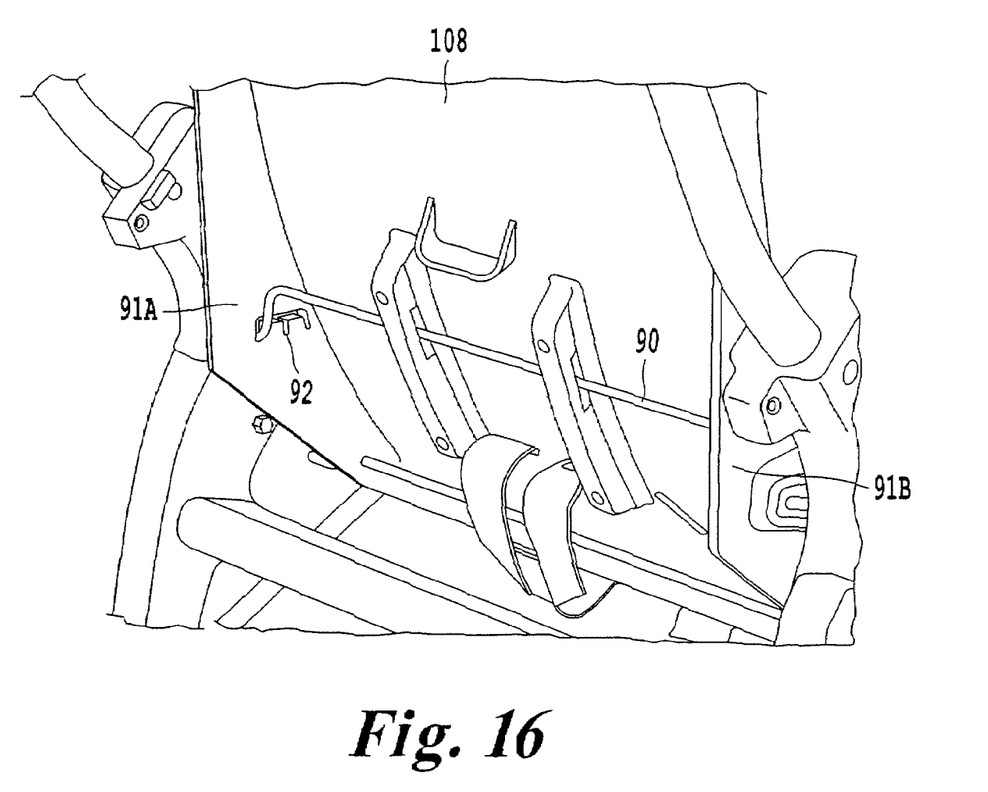
FIG. 16 is a schematic of a rigid memory back according to an example embodiment of the invention.

Backrest 108 includes a rigid memory back feature which provides backrest 108 with a set incline in an unfolded state, that after the stroller is folded and unfolded, maintains the backrest in the previously set incline. Backrest 108 includes a recline pivot bar 90 which supports backrest 108 from the rear. Recline pivot bar 90 passes through flanges 91A, 91B located to protrude rearwardly from backrest 108. Flanges 91A, 91B are provided with through-holes which include adjustment grooves 92. Recline pivot bar 90 is biased via a resilient member to engage with grooves 92 to provide recline positions for backrest 108. Recline pivot bar 90 passes through flanges 91A, 91B and is pivotally attached to pivot frame 118 and an end of link 93. Another end of link 93, opposite to the end attached to recline pivot bar 90 is pivotally attached to an intermediate portion of slider 116. As pivot frame 118 pivots and slider 116 moves along front leg 112, backrest 108 pivots while recline pivot bar 90 remains in engagement with a selected adjustment groove 92. In a folded state recline pivot bar 90 remains engaged with the selected adjustment groove 92. When stroller 2 is returned to an unfolded state recline pivot bar 90 is still engaged with the selected adjustment groove 92 to provide the rigid memory back feature.

While this invention has been described in conjunction with exemplary embodiments outlined above, it is evident that many alternative, modifications and variations will be apparent to those skilled in the art. Accordingly, the exemplary embodiments of this invention, as set forth above, are intended to be illustrative, not limiting. Various changes may be made without departing from the spirit and scope of the invention.

The invention claimed is:

1. A folding chair, comprising:
   two front legs and two rear legs configured to support the chair in an upright position;
   two handle frames;
   two first upper sliders configured to slide along respective handle frames;
   an upper X frame including two upper frame members pivotally connected to each other at respective intermediate portions, each upper frame member pivotally connected to respective first upper sliders and to respective rear legs;
   two second lower sliders configured to slide along respective front legs;
   a lower X frame member including two lower frame members pivotally connected to each other at respective intermediate portions, each lower frame member pivotally connected to respective second lower sliders and attached to respective rear legs;
   two pivot frames linked to respective second sliders and pivotally attached to respective rear leg two side frames pivotally attached to respective second lower sliders and respective pivot frames;
   two lateral portions rotationally attached to respective sides frames and to respective rear legs;and
   a seat portion supported by the back side frames and lateral portion.

2. The folding chair according to claim 1, further comprising:
   wheels rotationally attached to the front legs; and
   wheels rotationally attached to the rear legs.

3. The folding chair according to claim 1 where the lower frame members include engaging portions configured to engage a respective rear leg to prevent the chair from folding when in an unfolded state, and provide lateral rigidity.

4. The folding chair according to claim 3, wherein the engaging portions are formed as grooves configured to retain respective rear legs.

5. A method of folding a chair including two front legs and two rear legs configured to support the chair in an upright position, two handle frames, two first upper sliders configured to slide along respective handle frames, an upper X frame including two upper frame members pivotally connected to each other at respective intermediate portions, each upper frame member pivotally connected to respective first upper sliders and to respective rear legs, two second lower sliders configured to slide along respective front legs, a lower X frame member including two lower frame members pivotally connected to each other at respective intermediate portions, each lower frame member pivotally connected to respective second lower sliders and attached to respective rear legs, and two pivot frames linked to respective second sliders and pivotally attached to respective rear legs, the method comprising:

- detaching the two lower frame members from respective rear legs;
- pivoting a top portion of handle frames toward a front of the chair;
- sliding first upper sliders upward along respective handle frames and sliding second lower sliders downward along respective front legs so that handle frames, front legs and rear legs become substantially parallel in their length directions; and
- collapsing the upper frame member and the lower frame members about their respective intermediate pivot points so that the two handle frames move toward each other, the two front legs move toward each other and the two rear legs move toward each other.

* * * * *